No. 652,401. Patented June 26, 1900.
T. S. MOSSMAN.
DERRICK CRANE.
(Application filed Sept. 12, 1899.)
(No Model.) 3 Sheets—Sheet 1.

WITNESSES.

INVENTOR.
Theophilus Stanley Mossman
By 
ATTORNEYS

No. 652,401. Patented June 26, 1900.
T. S. MOSSMAN.
DERRICK CRANE.
(Application filed Sept. 12, 1899.)
(No Model.) 3 Sheets—Sheet 2.
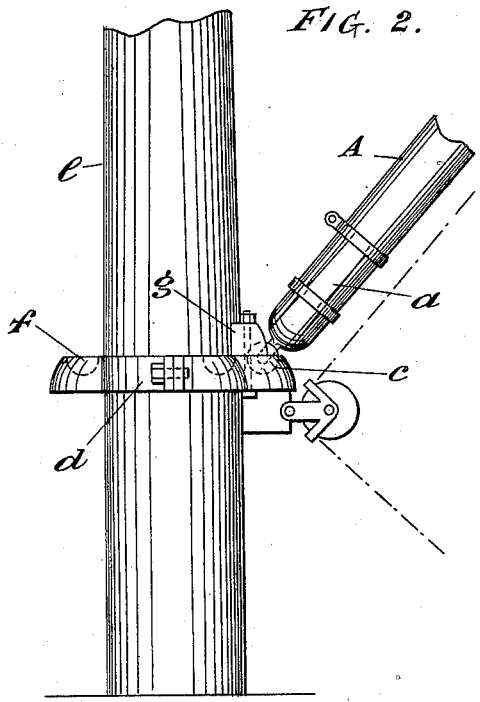
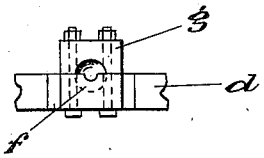
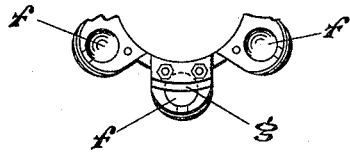
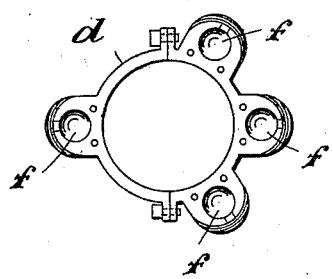
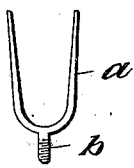
WITNESSES.
Ella L. Giles
INVENTOR.
Theophilus Stanley Mossman
ATTORNEYS

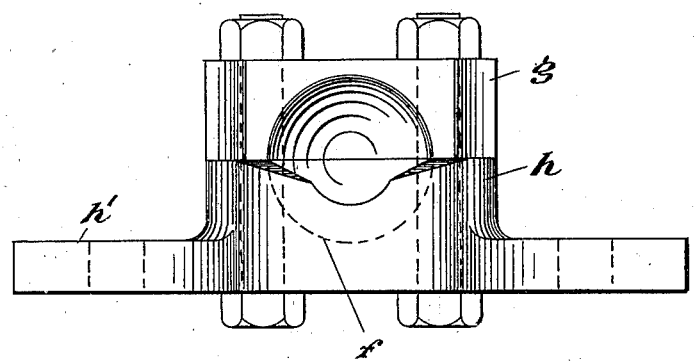
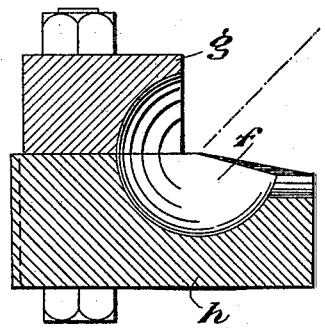
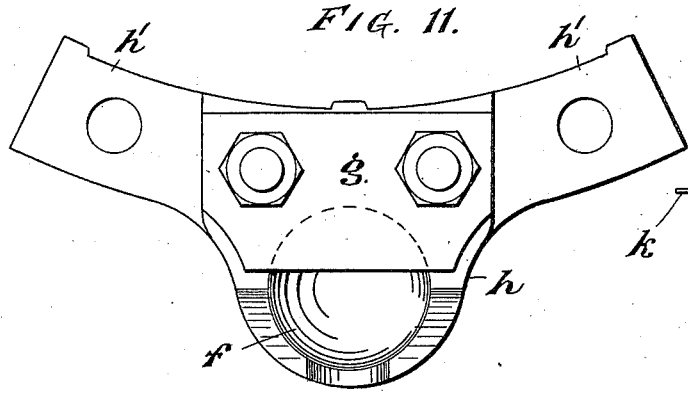
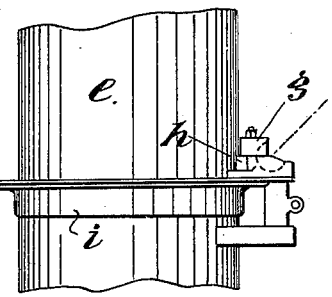
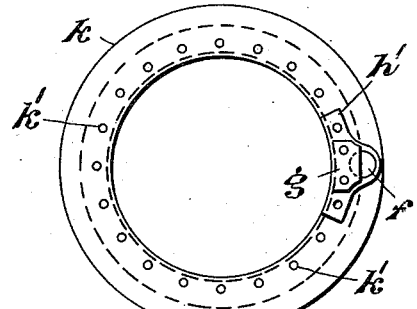

UNITED STATES PATENT OFFICE.

THEOPHILUS STANLEY MOSSMAN, OF SEAFORTH, ENGLAND.

DERRICK-CRANE.

SPECIFICATION forming part of Letters Patent No. 652,401, dated June 26, 1900.

Application filed September 12, 1899. Serial No. 730,212. (No model.)

*To all whom it may concern:*

Be it known that I, THEOPHILUS STANLEY MOSSMAN, a subject of the Queen of Great Britain and Ireland, and a resident of 3 Claremont road, Seaforth, Liverpool, England, have invented a certain new and useful Derrick-Crane, (for which I have made application for British Patent No. 13,951, dated July 6, 1899,) of which the following is a specification.

This invention relates to derrick-cranes; and it consists of an improved method of swiveling the lower or fulcrum end of the derrick jib or boom.

Figure 1:
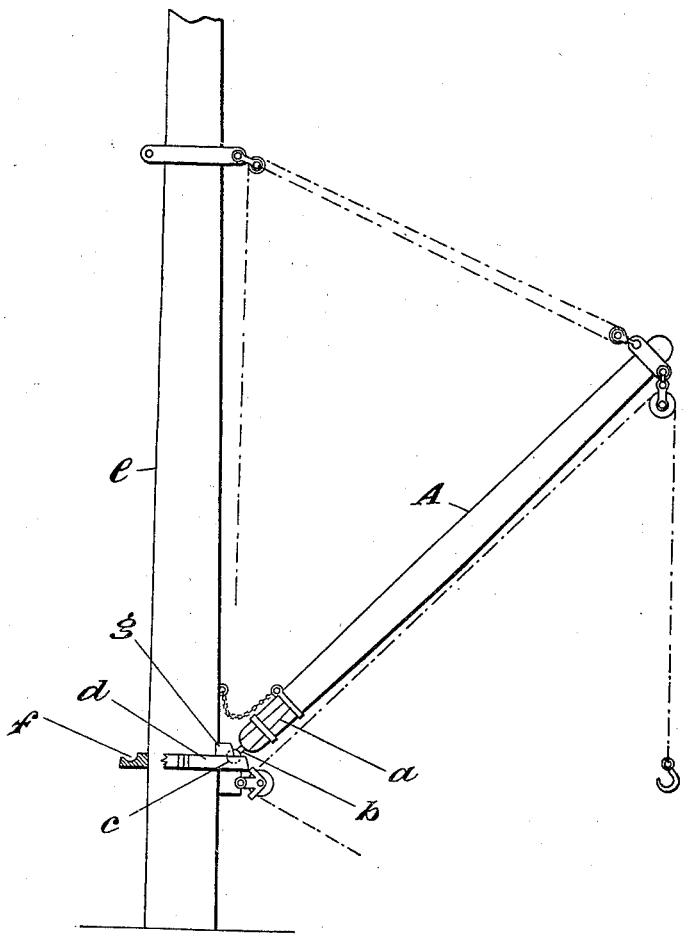
Figure 1:

Referring to the drawings, Figure 1 is a side view of a derrick-crane whose boom is swiveled according to my invention. Fig. 2 is a side elevation of my improved means of swiveling a derrick-boom, and Fig. 3 is a plan thereof. Figs. 4 and 5 are respectively a front view and plan showing the means employed for retaining the boom end in place. Figs. 6, 7, and 8 are details of the boom end. Figs. 9, 10, and 11 are respectively a front view, cross-section, and plan of a modified form of swivel-socket; and Figs. 12 and 13 are an elevation and plan showing its application to a mast.

The foot of the boom A is fitted with a forked clamp $a$, upon which is formed the pin $b$. This pin is screwed into a steel ball $c$, which forms the pivot of the boom. A ring $d$, formed in two halves, embraces the mast or standard $e$ and is secured thereto by bolts. Upon this ring are formed a series of cups $f$ of size to receive the ball $c$. The cups $f$ form sockets for the ball $c$ and allow of the boom being pivoted at different points on the circumference of the mast $e$ at will, so that the boom may be adjusted to the best position for dealing with the goods to be raised or lowered. In order to retain the ball $c$ in its cup $f$, the cap $g$ is placed over such cup and secured to the ring $d$ by bolts. This cap partially incloses the ball $c$ in the cup $f$—that is to say, the cap $g$ and cup $f$ receive more than one-half of the ball and so retain it, while at the same time allowing the boom to assume the different inclinations necessary in ordinary work.

In Figs. 9, 10, and 11 is shown a single socket $h$, possessing a cup $f$ and a cap $g$. The socket $h$ has flanges $h'$, possessing bolt-holes, and is adapted to be secured at any point on the circumference of the mast $e$, as follows: Around the mast $e$ is riveted or bolted an angle-iron $i$, Figs. 12 and 13. Upon this angle-iron is riveted a plate $k$. In the plate $k$ and angle-iron are drilled bolt-holes $k'$, which coincide with the bolt-holes in the socket-flanges $h'$. The socket $h$ may thus be bolted down to any desired part of the plate $k$.

By my invention the point of fulcra is kept close to the mast $e$ and the weight on the boom is concentrated on such point. I dispense with the present gooseneck or pin-joint and its overhanging parts and weakness. The boom may not only move in the vertical plane, but may swing in any direction, owing to the universal-movement capability of the ball $e$.

Having now described my invention, what I claim, and desire to secure by Letters Patent, is—

In a derrick, the combination with the mast of a ring secured thereto having a plurality of holes, a block having a hemispherical cavity, bolts for securing said block to any portion of said ring, a boom having a ball end adapted to rest in said recess or cavity and a detachable retaining-cap, substantially as described.

In witness whereof I have hereunto set my hand in presence of two witnesses.

THEOPHILUS STANLEY MOSSMAN.

Witnesses:
F. G. MAJOR,
R. OWEN.